US006871918B2

United States Patent
Wild et al.

(10) Patent No.: US 6,871,918 B2
(45) Date of Patent: Mar. 29, 2005

(54) METHOD FOR THE RELIABLE OPERATION OF A BRAKE BOOSTER SYSTEM, BRAKE BOOSTER SYSTEM, AND CIRCUIT THEREFOR FOR IMPLEMENTING THE METHOD

(75) Inventors: Ernst Wild, Oberriexingen (DE); Kristina Eberle, Markgroningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/207,362

(22) Filed: Jul. 29, 2002

(65) Prior Publication Data

US 2003/0038539 A1 Feb. 27, 2003

Related U.S. Application Data

(63) Continuation-in-part of application No. 09/613,941, filed on Jul. 11, 2000, now abandoned.

(30) Foreign Application Priority Data

Jul. 30, 1999 (DE) .......................................... 199 35 899

(51) Int. Cl.[7] .................................................. B60T 8/88
(52) U.S. Cl. ............................ 303/122.09; 303/122.05; 303/114.3
(58) Field of Search ........................... 303/113.3, 114.1, 303/114.3, 122.08, 122.09, 122.04, 122.05, 122.1, 122.15; 188/113.3, 114.1, 114.3, 122.08, 122.09, 122.04, 122.05, 122.1, 122.15

(56) References Cited

U.S. PATENT DOCUMENTS

| | | | |
|---|---|---|---|
| 5,826,559 A | 10/1998 | Ichimoto et al. | 123/295 |
| 5,918,462 A | 7/1999 | Mitani | 60/397 |
| 5,938,297 A | 8/1999 | Whaite et al. | 303/114.3 |
| 5,954,406 A | 9/1999 | Sawada | 303/122.09 |
| 6,062,656 A | 5/2000 | Unterforsthuber et al. | 303/122.09 |
| 6,132,014 A | 10/2000 | Kiso et al. | 303/146 |
| 6,283,559 B1 | 9/2001 | Yamada et al. | 303/113.3 |
| 6,393,345 B1 * | 5/2002 | Kerns et al. | 701/34 |
| 6,493,617 B1 * | 12/2002 | Russell et al. | 701/34 |
| 6,557,403 B1 * | 5/2003 | Kerns | 73/121 |

FOREIGN PATENT DOCUMENTS

| | | |
|---|---|---|
| DE | 197 43 959 A1 | 4/1999 |
| JP | 5-319250 | 12/1993 |
| JP | 10-329703 | 12/1998 |
| JP | 2000-168546 | 6/2000 |

* cited by examiner

*Primary Examiner*—Thomas Williams
(74) *Attorney, Agent, or Firm*—Baker & Daniels

(57) ABSTRACT

A method and system for ensuring reliable operation of a brake booster system for a vehicle braking system in which a pressure value prevailing in the brake pressure reservoir of the brake booster system is sensed by a pressure sensor. An error occurring in the brake booster system is detected by evaluating the sensed pressure value prevailing in the brake pressure reservoir as a function of the actuation of the brake actuating mechanism. The brake booster system includes a diagnostic circuit that is connected to the pressure sensor and to the brake actuating mechanism.

10 Claims, 3 Drawing Sheets

METHOD FOR THE RELIABLE OPERATION OF A BRAKE BOOSTER SYSTEM, BRAKE BOOSTER SYSTEM, AND CIRCUIT THEREFOR FOR IMPLEMENTING THE METHOD

CROSS REFERENCE TO RELATED APPLICATIONS

This is a continuation-in-part of application Ser. No. 09/613,941 filed Jul. 11, 2000 abandoned the disclosure of which is hereby incorporated by reference. This application claims priority under 35 U.S.C. 119 of German application serial no. 199 35 899.0 filed on Jul. 30, 1999.

BACKGROUND OF THE INVENTION

The invention relates to a method for the reliable operation of a brake booster system for a braking system of a motor vehicle, particularly a motor vehicle powered by an internal combustion engine, wherein a pressure value prevailing in the brake pressure reservoir of the brake booster system is acquired by means of a pressure sensor. The invention additionally relates to a brake booster system, particularly a vacuum brake booster system, for a vehicle braking system that can be actuated by means of an actuating mechanism. The brake booster system includes a brake pressure reservoir and, associated therewith, a pressure sensor that acquires the pressure value prevailing in the brake pressure reservoir of the brake booster system. The invention is further directed to a circuit for implementing the aforesaid method and for installation in the aforesaid brake booster system.

Motor vehicles, particularly those powered by internal combustion engines, are often provided with braking systems that are equipped with a brake booster system designed to support the muscular energy of the driver with additional energy. In so-called hydraulic brake booster systems, this additional energy is produced by means of an overpressure prevailing in the brake pressure reservoir and delivered by a hydraulic pump. In so-called vacuum brake booster systems, this additional energy is produced by means of an underpressure prevailing in the brake pressure reservoir and generated from the intake tube of the internal combustion engine or delivered by a vacuum pump. For the reliable operation of brake booster systems, a pressure sensor is conventionally built into the brake pressure reservoir to check whether sufficient pressure is present therein. The pressure sensor is connected to a brake pressure control system that increases or decreases the brake pressure in the brake pressure reservoir on the basis of the pressure value measured by the pressure sensor. For example, in a conventional method for operating a vacuum brake booster system, a higher throttle ratio (the intake-tube pressure divided by the pressure before the throttle valve) is requested by the pressure sensor if too low of an under pressure is measured in the brake pressure reservoir. However, this known method has the disadvantage that the brake pressure regulator operates incorrectly if an error occurs in the brake booster system, especially if a defective pressure sensor has been installed in the brake pressure reservoir. It is desirable, however, to be able to ensure adequate pressure for the brake booster system in such cases as well.

SUMMARY OF THE INVENTION

The present invention provides a method and a brake booster system that operate reliably even if an error occurs, particularly if the pressure sensor is defective. In addition, the present invention produces a circuit for implementing the aforesaid method and for installation in the brake booster system.

In accordance with the present invention, the actuation of the brake is monitored and an error occurring in the brake booster system is detected by evaluating, as a function of the actuation of the brake, the pressure value acquired by the pressure sensor. To this end, the brake booster system according to the invention has a diagnostic circuit which is connected to the pressure sensor and to the actuating mechanism and which, in order to detect an error occurring in the brake booster system, evaluates as a function of the actuation of the brake, the pressure value acquired by the pressure sensor.

The invention is based on the recognition that a functional pressure sensor must measure certain characteristic pressure values or pressure variations in the brake pressure reservoir as a function of the actuation of the brake. However, if the measured pressure values deviate too sharply from these characteristic pressure values, a defect is present in the brake booster system and the brake pressure regulator cannot function properly. According to the present invention errors, particularly a defective pressure sensor or leakage in the brake booster system, can be diagnosed while the brake booster system is in operation. The invention can be used in hydraulic as well as vacuum brake booster systems.

When the present invention is used in a vacuum brake booster system, the intake-tube pressure in the internal combustion engine of the motor vehicle is acquired and a presettable first pressure tolerance is applied thereto. It is then checked whether the acquired pressure value is lower than the acted-upon intake-tube pressure when there is no actuation of the brake for a presettable time. In this way it becomes possible to diagnose stand-by condition of the brake booster system, i.e., the condition in which the brake has not been actuated recently and is ready for further actuation, thereby substantially increasing the operating reliability of the braking system. Unless indicated otherwise, the pressure values discussed in the present application, e.g., intake-tube pressure values, ambient pressure values and reservoir pressure values, are absolute pressure values.

In this connection, it is especially advantageous if the ambient pressure at the internal combustion engine of the motor vehicle is also acquired and a presettable second pressure tolerance is applied thereto, and if it is checked whether the acquired pressure value is lower than the acted-upon ambient pressure. In this way an error is detected when the brake booster system is in either stand-by condition or activated condition, thereby increasing reliability throughout the operating time of the braking system, i.e., for the entire time the motor vehicle is being driven.

In a further embodiment of the invention, the acquired pressure value is monitored over time and a pressure increase is determined therefrom, and it is then checked whether this pressure increase is smaller than a presettable maximum increase for such time as there is no actuation of the brake. This permits very rapid diagnosis of any leaks that may occur when the brake booster system is in stand-by condition.

In another embodiment of the invention, it is checked whether the acquired pressure value increases when the brake is actuated. This permits the prompt detection of any leakage that occurs when the brake booster system is in activated condition.

The present invention, in yet another form thereof, comprises a method for the reliable operation of a brake booster system which is used in combination with an internal combustion engine which includes an intake tube. The brake booster system has a brake actuator and a brake pressure reservoir. The method includes providing a pressure sensor and sensing a sensed pressure value prevailing in the brake pressure reservoir of the brake booster system with the pressure sensor. The method also includes monitoring actuation of the brake actuator and determining if an error occurs in the brake booster system by evaluating the monitored actuation of the brake actuator and the sensed pressure value. Further steps include acquiring a pressure of the intake-tube and applying a presettable first pressure tolerance to the acquired pressure to produce an acted-upon intake-tube pressure, determining whether the sensed pressure value is lower than the acted-upon intake-tube pressure when there is no actuation of the brake actuator for a presettable time period, and regulating pressure of the brake booster system.

Alternative embodiments of this method may also include acquiring an ambient pressure at the internal combustion engine, applying a presettable second pressure tolerance to the ambient pressure to produce an acted-upon ambient pressure and determining whether the sensed pressure value is lower than the acted-upon ambient pressure. The method may also include monitoring the sensed pressure value over time and determining a pressure increase therefrom; and determining whether the pressure increase is smaller than a presettable third pressure tolerance over a time period during which no actuation of the brake actuator occurs. The method may also include determining whether the sensed pressure value increases when the brake actuator is actuated.

The present invention, in still another form thereof, comprises a brake booster system for a braking system actuated by means of a brake actuating mechanism. The brake booster system is used in combination with an internal combustion engine which includes an intake tube. The brake booster system includes a brake pressure reservoir, a pressure sensor arranged to sense a prevailing pressure value prevailing in the brake pressure reservoir, and a diagnostic circuit coupled to the pressure sensor and to the brake actuating mechanism. The diagnostic circuit evaluates actuation of the brake actuating mechanism and the prevailing pressure value and thereby detects an error in the brake booster system. The diagnostic circuit includes a first evaluating unit that acquires an intake-tube pressure at the intake tube and applies a presettable first pressure tolerance to the intake tube pressure to thereby produce an acted-upon intake-tube pressure. The first evaluating unit determines whether the prevailing pressure value is lower than the acted-upon intake-tube pressure when there is no actuation of the brake actuating mechanism for a presettable time period.

Alternative embodiments of this brake booster system may have a diagnostic circuit which also includes a second evaluating unit that acquires an ambient pressure at the internal combustion engine and applies to the ambient pressure a presettable second pressure tolerance and thereby produces an acted-upon ambient pressure. The second evaluating unit determines whether the prevailing pressure value is lower than the acted-upon ambient pressure. Alternative forms of the brake booster system may have a diagnostic circuit which includes an evaluating unit that determines whether the sensed pressure value increases when there is no actuation of the brake actuating mechanism.

Still further alternative embodiments of such brake booster systems may include a diagnostic circuit that includes an evaluating unit that monitors the prevailing pressure value over time and determines therefrom a pressure increase and further determines whether such pressure increase is smaller than a presettable maximum increase value over a time period during which no actuation of the brake actuating mechanism occurs. Such a diagnostic circuit having an evaluating unit that monitors the prevailing pressure value over time may also include a first memory cell and a second memory cell wherein, after the expiration of a presettable time interval that commences with the release of the brake actuating mechanism, the prevailing pressure value is stored in the second memory cell and a new prevailing pressure value is stored in the first memory cell if the prevailing pressure value decreases after the expiration of a presettable delay time.

The present invention, in another form thereof, comprises a circuit for a brake booster system. The brake booster system includes a brake actuating mechanism, a brake pressure reservoir, and a pressure sensor that senses a prevailing pressure value prevailing in the brake pressure reservoir. The brake booster system is used in combination with an internal combustion engine which includes an intake tube. The circuit includes a diagnostic circuit that is coupled to the pressure sensor and to the brake actuating mechanism and includes means to evaluate actuation of the brake actuating mechanism and the prevailing pressure value sensed by the pressure sensor and therefrom detects an error in the brake booster system. The diagnostic circuit also includes a first evaluating unit that acquires an intake-tube pressure in the internal combustion engine and applies a presettable first pressure tolerance thereto to thereby produce an acted-upon intake-tube pressure. The first evaluating unit determines whether the prevailing pressure value is lower than the acted-upon intake-tube pressure when there is no actuation of the brake actuating mechanism for a presettable time period.

In accordance with the present invention, and as described in greater detail below with reference to the figures, a brake system may be provided wherein when the brake is not actuated for a long time, the pressure of the reservoir should be approximately equal to the intake-tube pressure. If this is not the case, a failure message is generated. When the sensed reservoir-pressure is greater than the sensed ambient-pressure this also leads to a failure message. At the end of a braking action, the sensed reservoir pressure may be stored in a Sample/Hold unit. When a period of time is elapsed after this storing of the "sample", the difference between the pressure value stored in the Sample/Hold unit and the current sensed pressure value is determined. When the brake was not actuated during this time period and the determined difference is greater than a threshold value, it is concluded that the system is not sufficiently leak-proof or has a leak. After making a comparison between such a difference and the threshold value, another "sample" pressure value is taken and when the actual sensed reservoir pressure value is lower than the pressure value stored in the Sample/Hold unit, the process for making a comparison after the elapse of the time period is started again.

Further features, applications and advantages of the invention will emerge from the following description of exemplary embodiments depicted in the drawings. All of the described features constitute the subject matter of the invention either in and of themselves or in any desired combination, regardless of how they are combined in the claims or what they refer back to, and regardless of how they are worded, described in the specification or depicted in the following drawings:

DESCRIPTION OF THE PRESENT INVENTION

Figure 1:
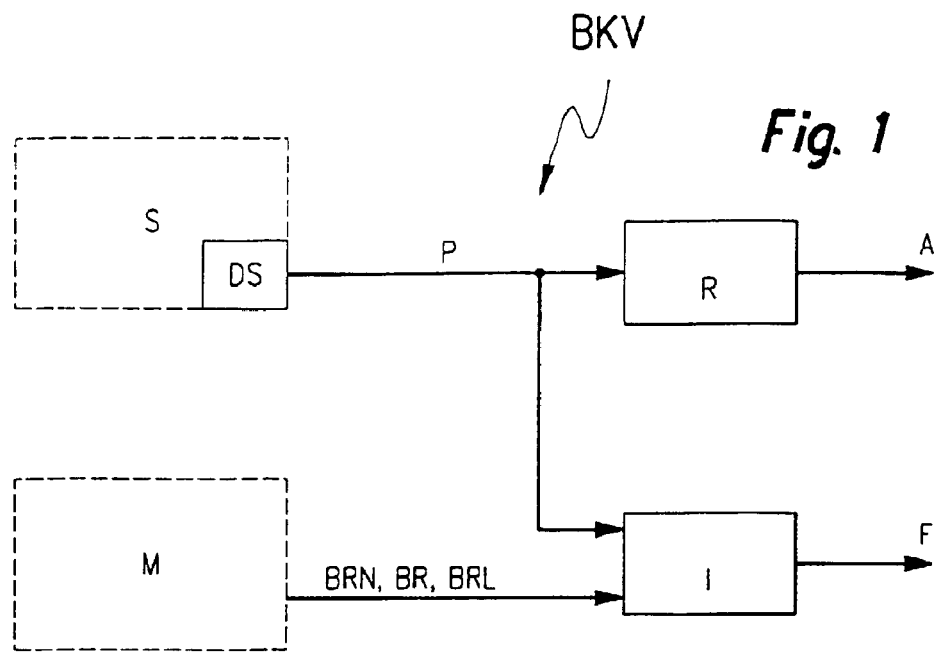
FIG. 1 schematically shows the structure of a brake booster system according to the invention.

FIG. 1 shows an exemplary embodiment of the invention that includes a vacuum brake booster system BKV comprising a brake pressure reservoir S, in which there is an underpressure coming from the intake tube of the internal combustion engine. Assigned to the brake pressure reservoir S is a pressure sensor DS that measures the underpressure. The measured pressure value P is supplied to a brake pressure regulator R, which controls the throttle ratio A (the intake-tube pressure divided by the pressure before the throttle valve) for the internal combustion engine.

The brake booster system BKV depicted in FIG. 1 additionally comprises a diagnostic circuit 1 that is connected to the pressure sensor DS and to the brake actuating mechanism M (a brake pedal, etc.). Fed to said diagnostic circuit 1 as input values are the measured pressure value P and the signals from the braking mechanism M, particularly the signal BRN ("brake not actuated"), the signal BR ("brake actuated") or the signal BRL ("brake released"). Diagnostic circuit 1 evaluates these input values and determines whether an error has occurred in the brake booster system BKV, in order then to generate an error signal F if necessary.

Figure 2:
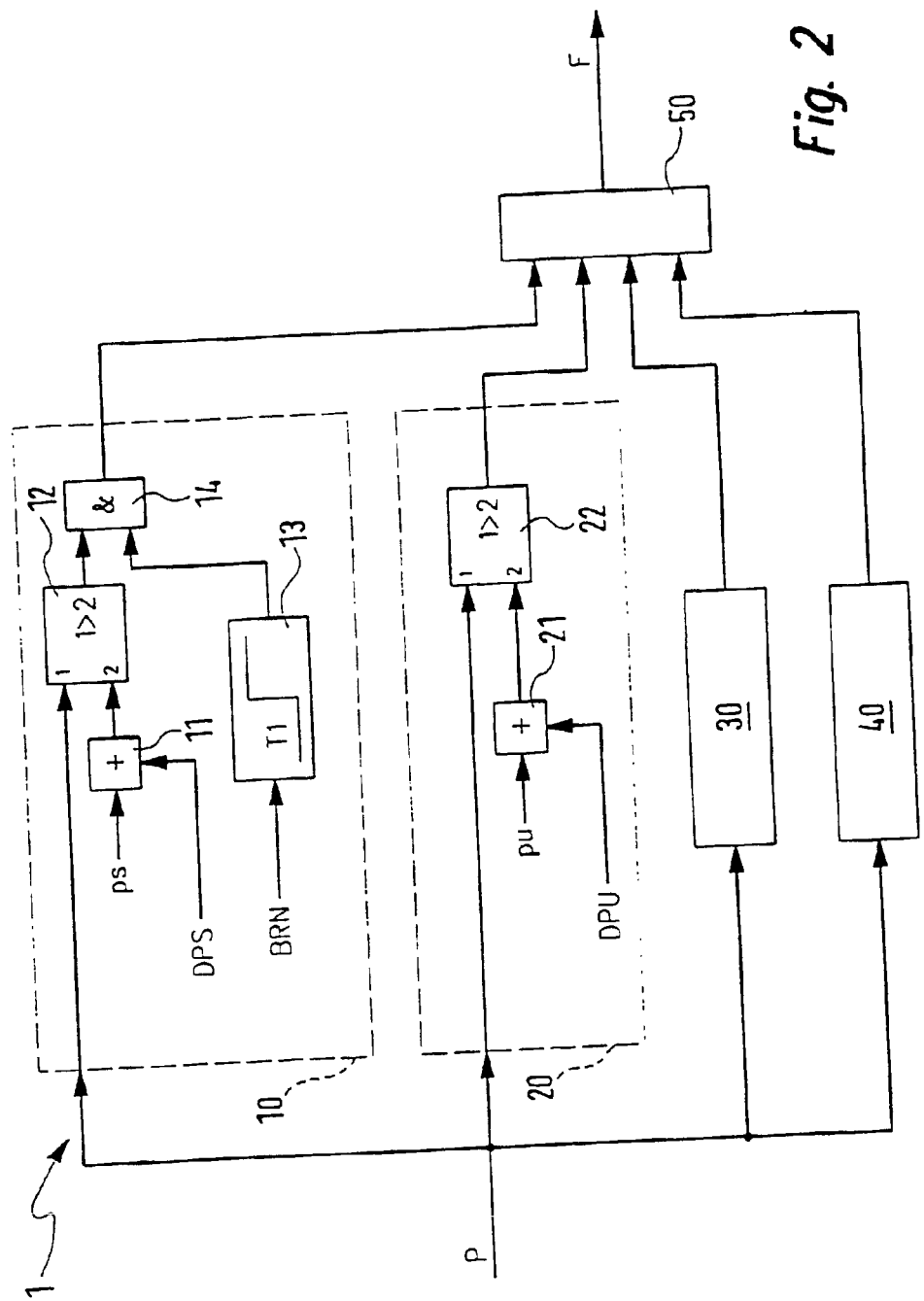
FIG. 2 is a schematic block circuit diagram of a diagnostic circuit installed in the brake booster system and operating according to the method of the invention.

FIG. 2 is a block circuit diagram of the diagnostic circuit 1, which includes four evaluating units 10, 20, 30 and 40 that will be described in further detail hereinbelow. The pressure value P acquired by the pressure sensor is routed to each of the evaluating units. Each evaluating unit can generate an error signal. All the outputs of the evaluating units are delivered to an OR gate 50, which always generates an error signal F when at least one of the evaluating units detects an error in the brake booster system.

The first evaluating unit 10 will now be described in more detail.

The input values for the first evaluating unit 10 are the measured pressure value P, the intake-tube pressure ps in the internal combustion engine, a presettable first pressure tolerance DPS and the signal BRN ("Brake not actuated") from the brake actuating mechanism. Evaluating unit 10 includes an adder 11, in which the pressure tolerance DPS is applied to the intake-tube pressure ps, and a comparator 12, which compares this acted-upon intake-tube pressure (ps+DPS) to the measured pressure value P. Evaluating unit 10 also includes an AND gate 14, whose first input is connected to the output of comparator 12 and whose second input is connected to the output of a time-switch element 13. The time-switch element 13 is set to a presettable time T1 and is triggered by the signal BRN. In this way it is checked whether there is no actuation of the brake during this presettable time T1. If this is the case, and if the measured pressure value P is greater than the acted-upon intake-tube pressure (ps+DPS), then both time-switch element 13 and comparator 12 each deliver a logical ONE. The AND gate 14 then also generates a logical ONE, which corresponds to a first error signal and is supplied to OR gate 50.

By means of first evaluating unit 10, therefore, the intake-tube pressure ps in the internal combustion engine is acquired and the presettable pressure tolerance DPS is applied thereto in order to check whether the pressure value P acquired by the pressure sensor has assumed a value characteristic of error-free operation of the brake booster system, i.e., whether the pressure value P is lower than the acted-upon intake-tube pressure (ps+DPS), if there is no actuation of the brake during presettable time T1. However, if the measured pressure value P is higher while the brake is in stand-by condition, i.e., for such time as there is no actuation of the brake, first evaluating unit 10 detects an error that can be attributed to a defect in the pressure sensor.

A further malfunction in the brake booster system is detected by means of the second evaluating unit 20, which will now be described in more detail with reference to FIG. 2.

The second evaluating unit 20 receives as input values, the measured pressure value P, the ambient pressure pu at the internal combustion engine and a second presettable pressure tolerance DPU. Second evaluating unit 20 includes an adder 21 in which the presettable pressure tolerance DPU is applied to the ambient pressure pu. Evaluating unit 20 also includes a comparator 22, which compares the measured pressure value P to the acted-upon ambient pressure (pu+DPU). By means of this sub-circuit, with the brake in activated condition ("Brake actuated") it is checked whether the pressure value P acquired by the pressure sensor is greater than the acted-upon ambient pressure (pu+DPU), which again means that the pressure sensor is defective. In this case the comparator 22 delivers a logical ONE, which indicates this error in the brake booster system. The output signal of comparator 22 is routed to the OR gate 50 as a second error signal.

The diagnostic circuit 1 shown in FIG. 2 further comprises a third evaluating unit 30 and a fourth evaluating unit 40, each of which detects a further malfunction in the brake booster system and delivers corresponding error signals to OR gate 50. Evaluating units 30 and 40 are described in more detail hereinbelow with reference to FIGS. 3 and 4.

Figure 3:
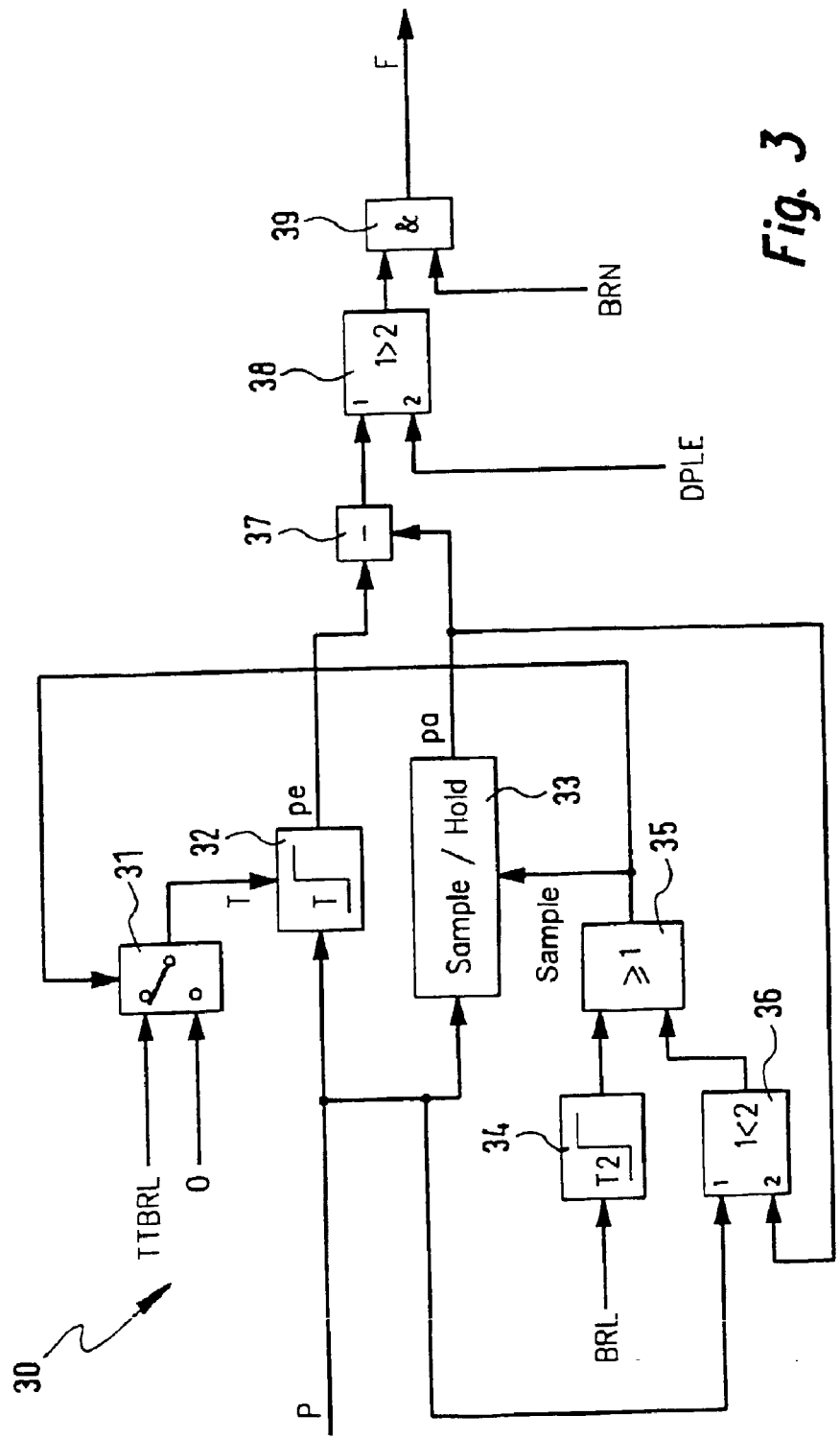
FIG. 3 schematically shows the structure of an evaluating unit that is part of the diagnostic circuit according to the invention.

FIG. 3 is the block circuit diagram of third evaluating circuit 30, which detects whether a leak has occurred in the brake booster system and generates an error signal if necessary. The input values available to third evaluating unit 30 are the measured pressure value P, the signals BRL ("Brake released") and BRN ("Brake not actuated") from the brake actuating mechanism, and a presettable maximum increase value DPLE. The measured pressure value P is written into two memory cells (RAM cells), one of which comprises a time-switch element 32 and the other comprises a sample-and-hold device 33. Said sample-and-hold device 33 is triggered by a hold signal and generates at the output a signal that indicates the initial pressure value pa acquired by the pressure sensor. Time-switch element 32 is triggered by a switch 31 and generates a signal that indicates the final pressure value pe acquired by the pressure sensor. A subtractor 37 determines from the final pressure value pe and the initial pressure value pa a difference (pe−pa) that reflects the pressure increase in the brake pressure reservoir.

To determine the initial value pa, the trigger input of sample-and-hold device 33 is connected to the output of a comparator 35, which compares the signal BRL ("Brake released") delivered by a time-switch element 34, to the output of another comparator 36. The other comparator 36 in turn compares the measured pressure value P to the initial pressure value pa delivered by sample-and-hold device 33.

The final pressure value pe is determined by routing the measured pressure value P to time switch element 32 which serves as a memory cell. Time-switch element 32 is driven via a switch 31 and set for a predetermined time T that corresponds to a presettable delay time (T=TTBRL). Switch 31 is in turn controlled by the output of comparator 35, which is connected to the trigger input of sample-and-hold device 33. The measured pressure value P is therefore written into memory cells 32 and 33 after time T2, which elapses after the brake is released. If the pressure value P then decreases further, the new, lower pressure value is written into the memory cells. In addition, the pressure value is written into the first memory cell 32 after a delay time TTBRL has elapsed. Thus, the memory cells supply the final pressure value pe and the initial pressure value pa from which is obtained the difference pe−pa used to calculate the pressure increase. This difference, the pressure increase, is compared to the presettable maximum increase value DPLE in comparator 38, which indicates an impermissible pressure increase in the event of a leak. If the pressure increase (pe−pa) determined is not smaller than this maximum increase value DPLE, then comparator 38 generates a logical ONE, which is delivered to an AND gate 39. The signal BRN ("Brake not actuated") is also delivered to this AND gate 39, so that AND gate 39 then outputs a third error signal F that is supplied to OR gate 50 if a relatively high pressure increase occurs despite the brake not being actuated. In other words, it is assumed that a malfunction due to leakage has occurred in the brake booster system if the pressure increase that occurs during the time for which the brake is not actuated is not smaller than the maximum increase value.

Figure 4:
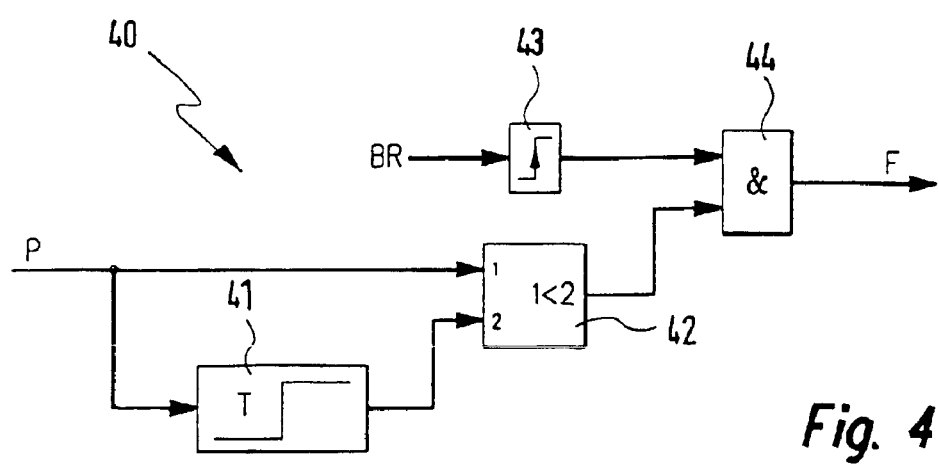
FIG. 4 schematically shows the structure of a further evaluating unit that is also part of the diagnostic circuit according to the invention.

FIG. 4 is a block circuit diagram of the fourth evaluating unit 40, which determines whether the pressure increases when the brake is actuated. If this is not the case, a fourth error signal F is generated. The input values fed to the inputs of evaluating unit 40 are the measured pressure value P and the signal BR ("Brake actuated") from the brake actuating mechanism. The signal BR ("brake actuated") is routed to an edge detector 43 that is connected to the input of an AND gate 44. The measured pressure value P is routed to the first input of a comparator 42 and to the input of a time-switch element 41, which is connected in turn to the second input of comparator 42. This circuit serves as a differentiating circuit, determining whether the pressure value P measured over time T is increasing.

The output of comparator 42 is connected to the input of AND gate 44, so that AND gate 44 generates a logical ONE which corresponds to a fourth error signal F that is supplied to OR gate 50 when there is no pressure increase despite the brake being actuated. Leaks that occur when the brake is in the activated state are thereby detected and are indicated as malfunctions.

Although the present invention has been described with reference to its applications in the field of vacuum booster brake systems, it is to be understood that the invention is not limited thereto, or limited at all to any specific booster brake system in general. For example, the invention lends itself equally well to use in hydraulic brake booster systems. Likewise, the invention can be used not only in motor vehicles powered by internal combustion engines, such as motor vehicles, but also in motor vehicles in general that are equipped with brake booster systems, such as electrically powered rail motor vehicles.

What is claimed is:

1. A method for the reliable operation of a brake booster system which is used in combination with an internal combustion engine which includes an intake tube, said brake booster system having a brake actuator and a brake pressure reservoir, said method comprising:

providing a pressure sensor;

sensing a sensed pressure value prevailing in the brake pressure reservoir of the brake booster system with the pressure sensor;

monitoring actuation of the brake actuator;

determining if an error occurs in the brake booster system by evaluating the monitored actuation of the brake actuator and the sensed pressure value;

acquiring a pressure of the intake-tube and applying a presettable first pressure tolerance to said acquired pressure to produce an acted-upon intake-tube pressure;

determining whether the sensed pressure value is lower than the acted-upon intake-tube pressure when there is no actuation of the brake actuator for a presettable time period; and regulating pressure of the brake booster system.

2. The method according to claim 1 and further comprising:

acquiring an ambient pressure at the internal combustion engine and applying a presettable second pressure tolerance to said ambient pressure to produce an acted-upon ambient pressure; and determining whether the sensed pressure value is lower than the acted-upon ambient pressure.

3. The method according to claim 2 and further comprising:

monitoring the sensed pressure value over time and determining a pressure increase therefrom; and determining whether the pressure increase is smaller than a presettable third pressure tolerance over a time period during which no actuation of the brake actuator occurs.

4. A method according to claim 1 and further comprising:

determining whether the sensed pressure value increases when the brake actuator is actuated.

5. A brake booster system for a braking system actuated by means of a brake actuating mechanism, said brake booster system used in combination with an internal combustion engine which includes an intake tube, said brake booster system comprising:

a brake pressure reservoir;

a pressure sensor arranged to sense a prevailing pressure value prevailing in the brake pressure reservoir;

a diagnostic circuit coupled to the pressure sensor and to the brake actuating mechanism, said diagnostic circuit evaluating actuation of the brake actuating mechanism and said prevailing pressure value and thereby detecting an error in the brake booster system; and said diagnostic circuit comprising a first evaluating unit that acquires an intake-tube pressure at the intake tube and applies a presettable first pressure tolerance to said intake tube pressure to thereby produce an acted-upon intake-tube pressure, said first evaluating unit determining whether the prevailing pressure value is lower than the acted-upon intake-tube pressure when there is no actuation of the brake actuating mechanism for a presettable time period.

6. A brake booster system according to claim 5 wherein the brake booster system is used in combination with an internal combustion engine, the diagnostic circuit further comprising a second evaluating unit that acquires an ambient pressure at the internal combustion engine and applies to said ambient pressure a presettable second pressure tolerance and thereby produces an acted-upon ambient pressure, said second evaluating unit determining whether the prevailing pressure value is lower than the acted-upon ambient pressure.

7. A brake booster system according to claim 5 wherein the diagnostic circuit further comprises an evaluating unit that monitors the prevailing pressure value over time and determines therefrom a pressure increase and further determines whether said pressure increase is smaller than a presettable maximum increase value over a time period during which no actuation of the brake actuating mechanism occurs.

8. A brake booster system according to claim 7, wherein the evaluating unit that monitors the prevailing pressure value over time comprises a first memory cell and a second memory cell, the prevailing pressure value stored in the second memory cell after the expiration of a presettable time interval that commences with the release of the brake actuating mechanism, and a new prevailing pressure value stored in the first memory cell if the prevailing pressure value decreases after the expiration of a presettable delay time.

9. A brake booster system according to claim 5 wherein the diagnostic circuit further comprises an evaluating unit that determines whether the sensed pressure value increases when there is no actuation of the brake actuating mechanism.

10. A circuit for brake booster system which includes a brake actuating mechanism, a brake pressure reservoir, and a pressure sensor that senses a prevailing pressure value prevailing in the brake pressure reservoir, said brake booster system used in combination with an internal combustion engine which includes an intake tube, said circuit comprising a diagnostic circuit that is coupled to the pressure sensor and to the brake actuating mechanism and includes means to evaluate actuation of the brake actuating mechanism and the prevailing pressure value sensed by the pressure sensor and therefrom detects an error in the brake booster system, said diagnostic circuit further comprising a first evaluating unit that acquires an intake-tube pressure in the internal combustion engine and applies a presettable first pressure tolerance thereto to thereby produce an acted-upon intake-tube pressure, said first evaluating unit determining whether the prevailing pressure value is lower than the acted-upon intake-tube pressure when there is no actuation of the brake actuating mechanism for a presettable time period.

* * * * *